United States Patent [19]
Yoshizawa et al.

[11] Patent Number: 5,128,222
[45] Date of Patent: Jul. 7, 1992

[54] ZINC-ALKALINE BATTERIES

[75] Inventors: Hiroshi Yoshizawa; Akira Miura, both of Katano; Yoshiaki Nitta, Osaka; Sachiko Sugihara, Higashiosaka, all of Japan

[73] Assignee: Matsushita Electric Industrial Co., Ltd., Osaka, Japan

[21] Appl. No.: 698,913

[22] Filed: May 13, 1991

[30] Foreign Application Priority Data

Apr. 22, 1991 [JP] Japan .................. 3-090508

[51] Int. Cl.$^5$ .................. H01M 10/26
[52] U.S. Cl. .................. 429/190; 429/198; 429/206; 429/229
[58] Field of Search .................. 429/190, 198, 206, 218, 429/229

[56] References Cited

U.S. PATENT DOCUMENTS

| | | | |
|---|---|---|---|
| Re. 33,427 | 11/1990 | Vignaud | 429/206 |
| 3,847,669 | 11/1974 | Paterniti | 136/30 |
| 4,074,028 | 2/1978 | Will | 429/198 |
| 4,195,120 | 3/1980 | Rossler et al. | 429/50 |
| 4,397,730 | 8/1983 | Bindra | 429/198 |
| 4,592,974 | 6/1986 | Takeda et al. | |
| 4,606,984 | 8/1986 | Vignaud | 429/212 |
| 4,735,876 | 4/1988 | Miura et al. | 429/206 |
| 4,942,101 | 7/1990 | Audebert et al. | 429/165 |
| 4,994,333 | 2/1991 | Jose et al. | 429/190 |

FOREIGN PATENT DOCUMENTS

| | | |
|---|---|---|
| 0205783 | 12/1986 | European Pat. Off. |
| 61-96666 | 5/1986 | Japan |
| 61-101955 | 5/1986 | Japan |
| 1-105466 | 4/1989 | Japan |

OTHER PUBLICATIONS

Chemical Abstracts, vol. 110, No. 24, p. 81, "Agriculture films containing polyethylene glycol fluoralkyl ether and sorbitan fatty acid esters" abstract No. 214460p.

Chemical Abstracts, vol. 111, No. 14, p. 55, "Anti-fogging plastic agricultural covering materials" abstract No. 116 486c.

Primary Examiner—William R. Dixon, Jr.
Assistant Examiner—Sue Hollenbeck
Attorney, Agent, or Firm—Stevens, Davis, Miller & Mosher

[57] ABSTRACT

The present invention provides a zinc-alkaline battery giving no environmental pollution and having an excellent shelf stability, which comprises a zinc alloy as an anode active material and an aqueous alkaline solution as an electrolyte, and manganese dioxide, silver oxide and oxygen as cathode active materials, the anode constituting the battery together with the cathode and the alkaline electrolyte being in a gel form and containing 0.001 to 0.1 wt % based on the weight of the zinc alloy of a surfactant as an organic inhibitor represented by the formula of $$(X)-C_nF_{2n}-(Y)-(CH_2CH_2O)_m-(Z)$$

wherein X is —H or —F, Y is —C$_2$H$_4$—O—CH$_2$CH(OH)—CH$_2$O—, Z is —CH$_3$, —PO$_3$W$_2$ or —SO$_3$W, wherein W is an alkali metal, n is 4 to 14 and m is 20 to 100, and the zinc alloy consisting of 0.01 to 1 wt % of indium, 0.005 to 0.5 wt % of one or more of lead and bismuth and the balance of zinc.

6 Claims, 1 Drawing Sheet

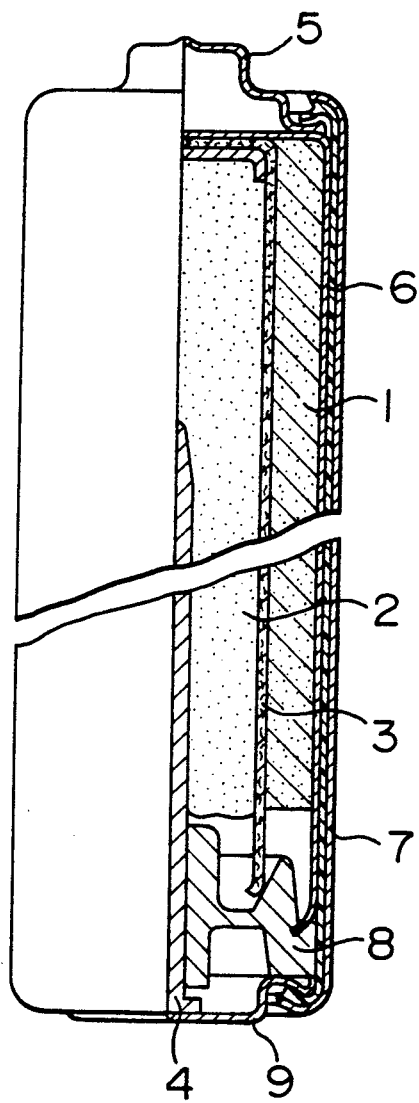

ZINC-ALKALINE BATTERIES

BACKGROUND OF THE INVENTION

The present invention relates to mercury-free zinc-alkaline batteries comprising zinc as an anode active material, an aqueous alkaline solution as an electrolyte, manganese dioxide as a cathode active material, silver oxide, oxygen, etc., which batteries have no adverse effect on environment and have an excellent shelf stability and discharge property.

DESCRIPTION OF RELATED ART

There has been a strong fear of environmental pollution due to mercury from used batteries for about ten years. Researches have been made on the reduction of the mercury content of alkaline batteries. As a result of the researches, corrosion resistant zinc alloys have been developed, which can reduce the mercury content of the alkaline batteries down to 250 ppm based on the weight of the batteries. However, as exemplified by a fear of the ozone layer destruction by chlorofluorocarbon gases, there is now the fear of world-wide environmental destruction by industrial products. Therefore, alkaline batteries completely free of mercury has still been demanded.

Efforts have been made to reduce the mercury content of alkaline batteries since alkaline batteries containing mercury added thereto were developed. Many patents and literatures have been issued or published, in which various materials such as zinc alloys, inorganic inhibitors and organic inhibitors are disclosed. Elements such as indium, lead and cadmium are known as a high hydrogen-overvoltage additive material for the anodes of secondary batteries as well as primary batteries. There are published many patent applications and literatures regarding methods of using these elements as alloying additives and methods of using the compounds of these elements as inorganic inhibitors.

For example, U.S. Pat. No. 4,735,876 discloses a method of using the elements as the alloying additives; Japanese Patent KOKOKI (Post-Exam. Publn.) No. Sho 51-36450, Japanese Patent KOKAI (Laid-Open) No. Sho 49-93831 and Japanese Patent KOKAI (Laid-Open) No. Sho 49-112125 disclose methods of adding indium oxide and indium hydroxide as the inorganic inhibitor; and Japanese Patent KOKAI (Laid-Open) No. Hei 1-105466 discloses a method of adding a mixture of indium oxide and cadmium oxide. Futhermore, Japanese Patent KOKAI (Laid-Open) Nos. Sho 61-96666 and 61-101955 disclose adding these elements as additives to the anodes of secondary batteries.

As the organic inhibitors, for example, U.S. Pat. No. 3,847,669 proposes ethylene oxide. Furthermore, U.S. Pat. No. 4,195,120 discloses organic phosphate esters of the ethylene oxide-adduct type, and U.S. Pat. No. 4,606,984 discloses perfluorate organic compounds of the ethoxylated fluoro alcohol type. As the mixed additive of inorganic inhibitor and organic inhibitor, for example, Japanese Patent KOKAI (Laid-Open) No. Hei 2-79367 proposes a mixture of indium hydroxide and perfluorate organic compounds of the ethoxylated fluoro alcohol type.

In a battery using pure zinc as the anode active material in the absence of mercury, corrosion reaction violently occurs with hydrogen being generated by zinc, whereby the inside pressure of battery is increased to expel the electrolyte outside the battery. Thus, there is a problem of electrolyte-leak.

In a partially-discharged battery, the hydrogen-generating rate at the zinc anode is accelerated, thereby further reducing the resistance to electrolyte-leak. This problem is caused by the removal of mercury which inhibits the corrosion reaction by raising the hydrogen overvoltage on the surface of zinc.

Even when a battery is made from a corrosion-resistant zinc alloy containing indium, aluminum and lead, which has been proved to render a mercury content-reduced zinc anode resistant to corrosion, without mercury, the electrolyte-leak resistance of the battery cannot be secured after partial discharging. Furthermore, even a battery made from a gel anode using a pure zinc powder as the anode active material and containing commercially available indium oxide and indium hydroxide added thereto, cannot have a practical electrolyte-leak resistance like the above-mentioned battery made from the corrosion resistant alloy.

Even when an amine type surfactant, which is known as a material for reducing the mercury content, is added as an organic inhibitor to a battery made from a gel anode using as the anode active material an indium, aluminum and lead-containing, corrosion-resistant zinc alloy, the electrolyte-leak resistance of the battery cannot be secured.

Moreover, even when a battery is made from a gel anode using a pure zinc powder as the anode active material to which a perfluorate organic compound of the ethoxylated fluoro alcohol type is added, the electrolyte-leak resistance of the battery cannot be secured after partial discharging.

As mentioned above, the current series of the batteries are not complete in inhibiting the corrosion and hence impractical at least in closed type ones.

In making it possible to realize mercury-free alkaline batteries, the present inventors have studied on the most effective materials of the corrosion resistant zinc alloys and organic inhibitors, respectively, and the optimum added state and amounts of the materials.

SUMMARY OF THE INVENTION

The primary object of the present invention is to provide zinc-alkaline batteries having no adverse effect on environment and having an excellent shelf stability and discharge property.

BRIEF DESCRIPTION OF THE DRAWING

The drawing is a half cross-sectional view of an alkaline manganese battery in an example of the present invention.

DETAILED DESCRIPTION OF PREFERRED EMBODIMENTS

The anode of the batteries according to the present invention is comprised of a corrosion-resistant zinc alloy and an alkaline electrolyte containing 0.001 to 0.1 wt % based on the zinc alloy of a surfactant suitable as an inhibitor having the formula of

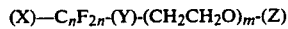

$$(X)-C_nF_{2n}-(Y)-(CH_2CH_2O)_m-(Z)$$

wherein X is $-H$ or $-F$, Y is $-C_2H_4-O-CH_2CH(OH)-CH_2O-$, Z is $-CH_3$, $-PO_3W_2$ or $-SO_3W$, wherein W is an alkali metal, n is from 4 to 14, and m is from 20 to 100. The corrosion-resistant zinc alloy is made of a corrosion-resistant zinc alloy powder comprising a proper combination of indium, lead, bismuth, lithium, calcium and aluminum in proper amounts. Preferably, the zinc alloy contains 0.01-1 wt % of indium and 0.005-0.5 wt % in total of one or more of lead and bismuth, or 0.01-1 wt % of indium, 0.005-0.5 wt % of one or more of lead and bismuth and 0.005-0.2 wt % in total of one or more of lithium, calcium and aluminum.

As is seen from the foregoing, the present inventors have made intensive studies and found the organic inhibitors, corrosion-resistant zinc alloys and combinations and amounts thereof which can exhibit the optimum advantages. The mechanisms for achieving the optimum advantages are now unclear but they are inferable as follows.

When the surfactant is present in the alkaline electrolyte together with the zinc alloy, it is chemically adsorbed on the surface of the zinc alloy through the metal soap principle to form a hydrophobic monomolecular layer which exhibits the corrosion-inhibiting effect.

From the viewpoint of a molecular structure, the surfactant having polyethylene oxide at the hydrophilic portion thereof is highly soluble in a micell form in the alkaline electrolyte. Therefore, the surfactant rapidly transfers to and is immediately adsorbed on the surface of the zinc alloy, when it is charged into the electrolyte. This means that the surfactant provides a high corrosion resistance to the zinc alloy. The greater the polymerization degree of the polyethylene oxide, the higher the solubility of the surfactant. When the surfactant has a highly hydrophobic fluoroalkyl group, the polymerization degree is desirably 20 or more. Furthermore, when the terminal of the polyethylene oxide is hydroxyl group or the oxide is in an alcohol form, the surfactant is susceptible to the hydrolysis. Therefore, the terminal group is preferably methyl group, sulfone group or phosphate group which is highly resistant to alkalis. If the oleophilic portion of the surfactant has a fluoroalkyl group, the group effectively prevents receiving and donating of electrons which causes the corrosion reaction, when the group is adsorbed on the surface of the zinc alloy. This is because the group is highly electrically insulating. The bond between the hydrophilic group and the oleophilic group preferably has a hydrophilic ether bond and hydroxyl group, rather than the water repelling alkyl group, because the ether bond and hydroxyl group bond more easily to the zinc alloy, so that the surfactant provides higher corrosion resistance.

Of the additive elements in the zinc alloy, indium, lead and bismuth themselves have a high hydrogen overvoltage and hence raise the hydrogen overvoltage of the surface of the zinc alloy when added to the zinc alloy. The function of the elements raising the hydrogen overvoltage is maintained even when a fresh surface of the zinc alloy appears during the discharging, if the elements are uniformly dispersed in the body of the zinc alloy. Furthermore, lithium, aluminum and calcium have a function of sphering zinc grains to reduce the true specific surface area of the zinc grains so that the amount of the zinc alloy corroded per unit weight is decreased.

The advantages by the combination of the organic inhibitor and the zinc alloy will be explained below. The surfactant is required to be chemically adsorbed smoothly and uniformly on the surface of the zinc alloy. Since hydrogen is violently generated on the surface of a zinc alloy having a low corrosion resistance, the chemical adsorption of the surfactant is prevented to provide an uneven adsorbed film. However, the generation of hydrogen is inhibited on the surface of a zinc alloy having a good corrosion resistance, so that the chemical adsorption of the surfactant takes place smoothly and uniformly to form an even adsorbed film. Thus, the advantages by the combination of the surfactant and the zinc alloy can be obtained. These advantages can be obtained even after the discharging.

The process for making the corrosion-resistant zinc alloy, the structure of an LR 6 alkaline manganese battery and the method of evaluating the resistance to electrolyte leak will be described below.

The corrosion-resistant zinc alloy powder is made by a so-called atomizing method in which zinc of 99.97% in purity is molten, predetermined additive elements are added in predetermined amounts to the melt, the melt is rendered uniform and then the melt is atomized by compressed air. The resulting particles are classified to be within the range of 45-150 mesh.

The zinc anode is prepared in such a manner as described below. To a 40% potassium hydroxide aqueous solution (also containing 3 wt % of ZnO) are added 3 wt % of sodium polyacrylate and 1 wt % of carboxymethyl cellulose to form a gel-like electrolyte. To the gel-like electrolyte is added a predetermined amount of a surfactant under stirring. The electrolyte is then aged for 2-3 hours. Then, the zinc alloy powder is mixed with the aged gel-like electrolyte in such a weight ratio that the amount of the former is two times larger than that of the gel-like electrolyte.

FIG. 1 is a cross-sectional view of the LR 6 alkaline manganese battery used in the example of the present invention. In this figure, reference number 1 denotes a cathode compound, 2 a gel-like anode featuring the present invention, 3 a separator, 4 a current collector of the gel-like anode, 5 a cathode terminal cap, 6 a metal case, 7 an outside housing of the battery, 8 a polyethylene-made resin plug for closing the opening of the case 6, and 9 a bottom plate forming the anode terminal.

In the method of evaluating the resistance to electrolyte leak, 100 of the LR 6 alkaline manganese batteries having the structure as shown in FIG. 1 were subjected to the partial discharging at a constant current of 0.85 A and a discharging voltage of 0.75 V which are severe to the LR 6 battery until 20% of the discharge capacity of the batteries was discharged, and the number of the leaked batteries after storage at 60° C. was evaluated as the leak index (%). If the leak index is zero (0) % after storage at 60° C. for 30 days under the severe conditions, the batteries are practically usable. However, the leak index representing the reliability of battery should be kept zero as long as possible.

The present invention will be illustrated below with reference to some examples.

EXAMPLE 1

The proper amount of the surfactant added when the zinc alloy and the surfactant are combined will be referred to in this example.

As a result of the research of various additive elements with changed amounts thereof, it has been found that zinc alloys containing one or more of indium, lead, bismuth, lithium, calcium and aluminum are appropriate.

Batteries made with the various zinc alloys and the changed amounts of the surfactants having the formula of $(X)-C_nF_{2n}-(Y)-(CH_2CH_2O)_m-(Z)$ wherein X was —F, Y was —C$_2$H$_4$—O—CH$_2$CH(OH)—CH$_2$O—, Z was —CH$_3$, n was 9 and m was 60, were subjected to the leak test by storage at 60° C. for 30 days. The results are shown in Table 1.

TABLE 1

Effect of the amount of the surfactant added in the case of the combination of the zinc alloy and the surfactant on the leak index % Leak index: Storing at 60° C. for 30 days

| | Additive elements and amounts thereof (wt %) | | | | | Inhibitor-free (Comparative) | Amount of surfactant (wt % based on Zn alloy) | | | | | | |
|---|---|---|---|---|---|---|---|---|---|---|---|---|---|
| No. | In | Pb | Bi | Al | Ca | 0 | 0.0005 | 0.001 | 0.005 | 0.01 | 0.05 | 0.1 | 0.2 |
| 1 | 0.5 | 0.2 | 0 | 0 | 0 | 47 | 19 | 0 | 0 | 0 | 0 | 0 | 20 |
| 2 | 0.5 | 0 | 0.05 | 0 | 0 | 30 | 24 | 0 | 0 | 0 | 0 | 0 | 13 |
| 3 | 0.2 | 0.1 | 0.05 | 0 | 0 | 28 | 12 | 0 | 0 | 0 | 0 | 0 | 24 |
| 4 | 0.2 | 0.1 | 0 | 0.02 | 0 | 37 | 13 | 0 | 0 | 0 | 0 | 0 | 20 |
| 5 | 0.2 | 0.1 | 0 | 0 | 0.02 | 28 | 10 | 0 | 0 | 0 | 0 | 0 | 15 |
| 6 | 0.2 | 0 | 0.05 | 0.02 | 0 | 26 | 8 | 0 | 0 | 0 | 0 | 0 | 16 |
| 7 | 0.2 | 0 | 0.05 | 0 | 0.02 | 19 | 9 | 0 | 0 | 0 | 0 | 0 | 14 |
| 8 | 0.2 | 0.1 | 0.05 | 0.02 | 0 | 16 | 11 | 0 | 0 | 0 | 0 | 0 | 18 |
| 9 | 0.2 | 0.1 | 0.05 | 0 | 0.02 | 11 | 13 | 0 | 0 | 0 | 0 | 0 | 8 |
| 10 | 0.2 | 0.1 | 0.05 | 0.01 | 0.01 | 21 | 14 | 0 | 0 | 0 | 0 | 0 | 8 |
| 11 | 0 | 0 | 0 | 0 | 0 | 85 | 45 | 32 | 31 | 25 | 41 | 32 | 34 |

From Table 1, it is seen that the use of the zinc alloys alone can secure no practical leak resistance even if the alloys have an excellent corrosion resistance, and further that no leak resistance can be secured even if the surfactant is combined with pure zinc. On the other hand, it is clear that the combination of the zinc alloy having an excellent corrosion resistance and the surfactant in an appropriate ratio can secure the leak resistance.

EXAMPLE 2

0.01 wt % of surfactants based on the weight of various zinc alloys were used. The surfactants had the formula of $(X)-C_nF_{2n}-(Y)-(CH_2CH_2O)_m-(Z)$ wherein X was —H, Y was —C$_2$H$_4$—O—CH$_2$CH(OH)—CH$_2$O—, Z was —CH$_3$, n was 9 and the polymerization degree of the ethylene oxide, m, varied. Batteries using these various zinc alloys and the surfactants were subjected to the leak test by storage at 60° C. for 30 days. The results are shown in Table 2.

TABLE 2

Effect of the polymerization degree m of ethylene oxide of the surfactants combined with the zinc alloys on the leak index

| | Additive elements and amounts thereof (wt %) | | | | | % Leak index: Storing at 60° C. for 30 days Amount of surfactant 0.01 wt % based on Zn alloy Effect of polymerization degree m of ethylene oxide | | | | |
|---|---|---|---|---|---|---|---|---|---|---|
| No. | In | Pb | Bi | Al | Ca | 10 | 20 | 40 | 60 | 100 |
| 12 | 0.5 | 0.2 | 0 | 0 | 0 | 21 | 0 | 0 | 0 | 0 |
| 13 | 0.5 | 0 | 0.05 | 0 | 0 | 28 | 0 | 0 | 0 | 0 |
| 14 | 0.2 | 0.1 | 0.05 | 0 | 0 | 25 | 0 | 0 | 0 | 0 |
| 15 | 0.2 | 0.1 | 0 | 0.02 | 0 | 18 | 0 | 0 | 0 | 0 |
| 16 | 0.2 | 0.1 | 0 | 0 | 0.02 | 14 | 0 | 0 | 0 | 0 |
| 17 | 0.2 | 0 | 0.05 | 0.02 | 0 | 12 | 0 | 0 | 0 | 0 |
| 18 | 0.2 | 0 | 0.05 | 0 | 0.02 | 11 | 0 | 0 | 0 | 0 |
| 19 | 0.2 | 0.1 | 0.05 | 0.02 | 0 | 15 | 0 | 0 | 0 | 0 |
| 20 | 0.2 | 0.1 | 0.05 | 0 | 0.02 | 18 | 0 | 0 | 0 | 0 |

TABLE 2-continued

Effect of the polymerization degree m of ethylene oxide of the surfactants combined with the zinc alloys on the leak index

| | Additive elements and amounts thereof (wt %) | | | | | % Leak index: Storing at 60° C. for 30 days Amount of surfactant 0.01 wt % based on Zn alloy Effect of polymerization degree m of ethylene oxide | | | | |
|---|---|---|---|---|---|---|---|---|---|---|
| No. | In | Pb | Bi | Al | Ca | 10 | 20 | 40 | 60 | 100 |
| 21 | 0.2 | 0.1 | 0.05 | 0.01 | 0.01 | 15 | 0 | 0 | 0 | 0 |

From Table 2, it is seen that the polymerization degree m of ethylene oxide of the surfactants is preferred to be 20 or more for the various zinc alloys. The same results were obtained with X being —F and Z being —PO$_3$W$_2$ or —SO$_3$W, wherein W was an alkali metal. The leak test was not conducted with the polymerization degree m of 100 or more, because the surfactants were hardly synthesized with such polymerization degree.

EXAMPLE 3

The amount of surfactants added to various zinc alloys was set to 0.01 wt %. The surfactants had the formula of $(X)-C_nF_{2n}-(Y)-(CH_2CH_2O)_m-(Z)$ wherein X was —H, Y was —C$_2$H$_4$O—CH$_2$CH(OH)—CH$_2$O—, Z was —CH$_3$ and m was 60, and the number n of the fluorinated carbons varied. Batteries using the zinc alloys and the surfactants were subjected to the leak test by storage at 60° C. for 30 days. The results are shown in Table 3.

TABLE 3

Effect of the number n of the fluorinated carbons of the surfactants combined with the zinc alloys on the leak index

| | Additive elements and amounts thereof (wt %) | | | | | % Leak index: Storing at 60° C. for 30 days Amount of surfactant 0.01 wt % based on Zn alloy Number n of fluorinated carbon of surfactant | | | |
|---|---|---|---|---|---|---|---|---|---|
| No. | In | Pb | Bi | Al | Ca | 2 | 4 | 8 | 14 |
| 22 | 0.5 | 0 | 0.05 | 0 | 0 | 15 | 0 | 0 | 0 |
| 23 | 0.2 | 0.1 | 0.05 | 0 | 0 | 14 | 0 | 0 | 0 |
| 24 | 0.2 | 0 | 0.05 | 0.02 | 0 | 13 | 0 | 0 | 0 |

TABLE 3-continued
Effect of the number n of the fluorinated carbons of the surfactants combined with the zinc alloys on the leak index

| | Additive elements and amounts thereof (wt %) | | | | | % Leak index: Storing at 60° C. for 30 days Amount of surfactant 0.01 wt % based on Zn alloy Number n of fluorinated carbon of surfactant | | | |
|---|---|---|---|---|---|---|---|---|---|
| No. | In | Pb | Bi | Al | Ca | 2 | 4 | 8 | 14 |
| 25 | 0.2 | 0 | 0.05 | 0 | 0.02 | 16 | 0 | 0 | 0 |
| 26 | 0.2 | 0.1 | 0.05 | 0 | 0.02 | 17 | 0 | 0 | 0 |
| 27 | 0.2 | 0.1 | 0.05 | 0.01 | 0.01 | 16 | 0 | 0 | 0 |

From Table 3 it is seen that the number of the fluorinated carbons is preferred to be 4 or more. The same results were obtained with Z being $-PO_3W_2$ or $-SO_3W$, wherein W was an alkali metal. The leak test was not conducted with the fluorinated carbon number of 15 or more, because the surfactants were hardly synthesized with such fluorinated carbon number.

EXAMPLE 4

0.01 wt % of the surfactants were used with the various zinc alloys. The surfactants had the formula of $$(X)-C_nF_{2n}-(Y)-(CH_2CH_2O)_m-(Z)$$

wherein X was $-H$ and Z was $-CH_3$, n was 9 and m was 60, and bonding group Y was changed to $-CH_2CH_2-$, $-SO_2NH-$ or $-C_2H_4-O-CH_2-CH(OH)-CH_2O-$. Batteries using the surfactants and the zinc alloys were subjected to the leak test by storage at 60° C. for 45 days. The results are shown in Table 4.

TABLE 4
Effect of the kind of bonding group Y of the surfactants combined with the zinc alloys on the leak index

| | Additive elements and amounts thereof (wt %) | | | | | % Leak index: Storing at 60° C. for 45 days Amount of surfactant 0.01 wt % based on Zn alloy Kind of bonding group Y of surfactant | | |
|---|---|---|---|---|---|---|---|---|
| No. | In | Pb | Bi | Al | Ca | $-CH_2CH_2-$ | $-SO_2NH-$ | $-C_2H_4-O-CH_2-CH(OH)-CH_2O-$ |
| 28 | 0.5 | 0 | 0.05 | 0 | 0 | 27 | 8 | 0 |
| 29 | 0.2 | 0.1 | 0.05 | 0 | 0 | 28 | 8 | 0 |
| 30 | 0.2 | 0 | 0.05 | 0.02 | 0 | 29 | 9 | 0 |
| 31 | 0.2 | 0 | 0.05 | 0 | 0.02 | 26 | 7 | 0 |
| 32 | 0.2 | 0.1 | 0.05 | 0 | 0.02 | 24 | 8 | 0 |
| 33 | 0.2 | 0.1 | 0.05 | 0.01 | 0.01 | 25 | 9 | 0 |

From Table 4 it is seen that bonding group Y is preferably $-C_2H_4-O-CH_2-CH(OH)-CH_2O-$. The same results were obtained with X being F and Z being $-PO_3W_2$ or $-SO_3W$, wherein W was an alkali metal.

EXAMPLE 5

0.01 wt % of surfactants based on the weight of various zinc alloys were used. The surfactants had the formula of $$(X)-C_nF_{2n}-(Y)-(CH_2CH_2O)_m-(Z)$$

wherein X was $-H$, Y was $-C_2H_4-O-CH_2-CH(OH)-CH_2O-$, n was 9 and m was 60, and terminal group Z was changed to $-H$, $-CH_3$, $-PO_3W_2$ or $-SO_3W$, wherein W was an alkali metal. Batteries using these surfactants were subjected to the leak text by storage at 60° C. for 30 days. The results are shown in Table 5.

TABLE 5
Effect of the kind of terminal group Z of the surfactants combined with the zinc alloys on the leak index

| | Additive elements and amounts thereof (wt %) | | | | | % Leak index: Storing at 60° C. 30 days Amount of surfactant 0.01 wt % based on Zn alloy Kind of terminal group Z of surfactant | | | |
|---|---|---|---|---|---|---|---|---|---|
| No. | In | Pb | Bi | Al | Ca | $-H$ | $-CH_3$ | $-PO_3W_2$ | $-SO_3W$ |
| 34 | 0.5 | 0 | 0.05 | 0 | 0 | 21 | 0 | 0 | 0 |
| 35 | 0.2 | 0.1 | 0.05 | 0 | 0 | 19 | 0 | 0 | 0 |
| 36 | 0.2 | 0 | 0.05 | 0.02 | 0 | 17 | 0 | 0 | 0 |
| 37 | 0.2 | 0 | 0.05 | 0 | 0.02 | 16 | 0 | 0 | 0 |
| 38 | 0.2 | 0.1 | 0.05 | 0 | 0.02 | 17 | 0 | 0 | 0 |
| 39 | 0.2 | 0.1 | 0.05 | 0.01 | 0.01 | 18 | 0 | 0 | 0 |

From Table 5 it is seen that the terminal group Z is preferably $-CH_3$, $-PO_3W_2$ or $-SO_3W$, wherein W is an alkali metal.

EXAMPLE 6

In this example, the limited compositions of corrosion-resistant zinc alloys are explained. The amount of the surfactant added to the zinc alloys as shown in Table 6 was set to 0.01 wt %. Batteries made from the surfactants and the various zinc alloys with the amounts of the additive elements changed were subjected to the leak test by storage at 60° C. for 30 days. The results are shown in Table 6.

TABLE 6
Effect of the compositions of the zinc alloys combined with the surfactant on the leak index

| | Additive elements and amounts thereof (wt %) | | | | | % Leak index: Storing at 60° C. for 30 days Amount of surfactant 0.01 wt % based on Zn alloy |
|---|---|---|---|---|---|---|
| No. | In | Pb | Bi | Al | Ca | |
| 40 | 0.01 | 0.1 | 0.05 | 0 | 0 | 0 |
| 41 | 0.05 | 0.1 | 0.05 | 0 | 0 | 0 |
| 42 | 0.5 | 0.1 | 0.05 | 0 | 0 | 0 |

TABLE 6-continued

Effect of the compositions of the zinc alloys combined with the surfactant on the leak index

| No. | Additive elements and amounts thereof (wt %) | | | | | % Leak index: Storing at 60° C. for 30 days Amount of surfactant 0.01 wt % based on Zn alloy |
|---|---|---|---|---|---|---|
| | In | Pb | Bi | Al | Ca | |
| 43 | 1.0 | 0.1 | 0.05 | 0 | 0 | 0 |
| 44 | 0.2 | 0 | 0.005 | 0 | 0 | 0 |
| 45 | 0.2 | 0 | 0.5 | 0 | 0 | 0 |
| 46 | 0.2 | 0.005 | 0 | 0 | 0 | 0 |
| 47 | 0.2 | 0.5 | 0 | 0 | 0 | 0 |
| 48 | 0.2 | 0.0025 | 0.0025 | 0 | 0 | 0 |
| 49 | 0.2 | 0.25 | 0.25 | 0 | 0 | 0 |
| 50 | 0.01 | 0 | 0.05 | 0 | 0.02 | 0 |
| 51 | 0.05 | 0 | 0.05 | 0 | 0.02 | 0 |
| 52 | 0.5 | 0 | 0.05 | 0 | 0.02 | 0 |
| 53 | 1.0 | 0 | 0.05 | 0 | 0.02 | 0 |
| 54 | 0.2 | 0 | 0.005 | 0 | 0.02 | 0 |
| 55 | 0.2 | 0 | 0.5 | 0 | 0.02 | 0 |
| 56 | 0.2 | 0 | 0.05 | 0.0025 | 0.0025 | 0 |
| 57 | 0.2 | 0 | 0.05 | 0.1 | 0.1 | 0 |
| 58 | 0.2 | 0.0025 | 0.0025 | 0.01 | 0.01 | 0 |
| 59 | 0.2 | 0.25 | 0.25 | 0.01 | 0.01 | 0 |
| 61 | 0.2 | 0.1 | 0.05 | 0.0025 | 0.0025 | 0 |
| 62 | 0.2 | 0.1 | 0.05 | 0.1 | 0.1 | 0 |

From Table 6 it is seen that the amount of the additive element added to the zinc alloy ranges preferably from 0.01 to 1 wt % for indium, from 0.005 to 0.5 wt % for lead and bismuth singly or in combination and from 0.005 to 0.2 wt % for calcium and aluminum singly or in combination.

The surfactant used in this example was the same as used in EXAMPLE 1.

The same results were obtained with lithium in place of aluminum.

The phosphate surfactants may be a mixture of a primary phosphate and a secondary phosphate.

What is claimed is:

1. A mercury-free zinc-alkaline battery which comprises a zinc alloy and an alkaline electrolyte containing 0.001 to 0.1 wt % based on the weight of said zinc alloy of a surfactant represented by the formula of $$(X)-C_nF_{2n}-(Y)-(CH_2CH_2O)_m-(Z)$$

wherein X is —H or —F, Y is —C$_2$H$_4$—O—CH$_2$CH(OH)—CH$_2$O—, Z is —CH$_3$, —PO$_3$W$_2$ or —SO$_3$W, wherein W is an alkali metal, n is 4 to 14 and m is 20 to 100.

2. A zinc-alkaline battery according to claim 1, wherein the zinc alloy contains about 0.005 to about 1 wt % of one or more of indium, lead, bismuth, lithium, calcium and aluminum.

3. A zinc-alkaline battery according to claim 2, wherein the zinc alloy contains 0.01 to 1 wt % of indium and 0.005 to 0.5 wt % of one or more of lead and bismuth.

4. A zinc-alkaline battery according to claim 2, wherein the zinc alloy contains 0.01 to 1 wt % of indium, 0.005 to 0.5 wt % of one or more of lead and bismuth and 0.005 to 0.2 wt % of one or more of lithium, calcium and aluminum.

5. A mercury-free zinc-alkaline battery which comprises a zinc alloy and an alkaline electrolyte, said zinc alloy consisting of 0.01 to 1 wt % of indium, 0.005 to 0.5 wt % of one or more of lead and bismuth and the balance of zinc and said electrolyte containing 0.001 to 0.1 wt % based on the weight of said zinc alloy of a surfactant represented by the formula of $$(X)-C_nF_{2n}-(Y)-(CH_2CH_2O)_m-(Z)$$

wherein X is —H or —F, Y is —C$_2$H$_4$—O—CH$_2$CH(OH)—CH$_2$O—, Z is —CH$_3$, —PO$_3$W$_2$ or —SO$_3$W, wherein W is an alkali metal, n is 4 to 14 and m is 20 to 100.

6. A mercury-free zinc-alkaline battery which comprises a zinc alloy and an alkaline electrolyte, said zinc alloy containing 0.01 to 1 wt % of indium, 0.0005 to 0.5 wt % of one or more of lead and bismuth and 0.005 to 0.2 wt % of one or more of lithium, calcium and aluminum and said electrolyte containing 0.001 to 0.1 wt % based on the weight of said zinc alloy of a surfactant represented by the formula of $$(X)-C_nF_{2n}-(Y)-(CH_2CH_2O)_m-(Z)$$

wherein X is —H or —F, Y is —C$_2$H$_4$—O—CH$_2$CH(OH)—CH$_2$O—, Z is —CH$_3$, —PO$_3$W$_2$ or —SO$_3$W, wherein W is an alkali metal, n is 4 to 14 and m is 20 to 100.

* * * * *